United States Patent
Kokojima et al.

(10) Patent No.: US 8,441,523 B2
(45) Date of Patent: May 14, 2013

(54) APPARATUS AND METHOD FOR DRAWING A STEREOSCOPIC IMAGE

(75) Inventors: Yoshiyuki Kokojima, Kanagawa-ken (JP); Sumihiko Yamamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 632 days.

(21) Appl. No.: 12/700,495

(22) Filed: Feb. 4, 2010

(65) Prior Publication Data

US 2010/0194864 A1 Aug. 5, 2010

(30) Foreign Application Priority Data

Feb. 5, 2009 (JP) .................................. P2009-024989

(51) Int. Cl.
*H04N 13/04* (2006.01)

(52) U.S. Cl.
USPC ........................................................... 348/51

(58) Field of Classification Search ...................... 348/51
See application file for complete search history.

(56) References Cited

U.S. PATENT DOCUMENTS

| 2005/0083400 A1* | 4/2005 | Hirayama et al. ......... 348/14.07 |
| 2006/0257016 A1* | 11/2006 | Shioi et al. ..................... 382/154 |

FOREIGN PATENT DOCUMENTS

| JP | 2004-257124 | 9/2004 |
| JP | 2005-102198 | 4/2005 |

* cited by examiner

*Primary Examiner* — Richard Torrente
(74) *Attorney, Agent, or Firm* — Finnegan, Henderson, Farabow, Garrett & Dunner, L.L.P.

(57) ABSTRACT

Coordinate values of an object located in a coordinate space are stored in a memory. The coordinate space is represented by a first direction, a second direction and a third direction each different. The coordinate values include first coordinate values along the first direction, second coordinate values along the second direction and third coordinate values along the third direction. A stereoscopic image of the object having a parallax along one of the first direction and the second direction is displayed. A direction of the parallax is detected. When the direction of the parallax is the first direction, the first coordinate values are subjected to a parallel projection. When the direction of the parallax is the second direction, the second coordinate values are subjected to the parallel projection.

3 Claims, 10 Drawing Sheets

| COORDINATE ELEMENT | PERSPECTIVE DIVISION |
|---|---|
| x | 0(INVALID) |
| y | 1(VALID) |
| z | 1(VALID) |
| w | 1(VALID) |

FIG. 6A

| COORDINATE ELEMENT | PERSPECTIVE DIVISION |
|---|---|
| x | 1(VALID) |
| y | 0(INVALID) |
| z | 1(VALID) |
| w | 1(VALID) |

| COORDINATE ELEMENT | PERSPECTIVE MULTIPLICATION |
|---|---|
| x | 1(VALID) |
| y | 0(INVALID) |
| z | 0(INVALID) |
| w | 0(INVALID) |

FIG. 9A

| COORDINATE ELEMENT | PERSPECTIVE MULTIPLICATION |
|---|---|
| x | 0(INVALID) |
| y | 1(VALID) |
| z | 0(INVALID) |
| w | 0(INVALID) |

APPARATUS AND METHOD FOR DRAWING A STEREOSCOPIC IMAGE

CROSS-REFERENCE TO RELATED APPLICATIONS

This application is based upon and claims the benefit of priority from Japanese Patent Application No. 2009-24989, filed on Feb. 5, 2009; the entire contents of which are incorporated herein by reference.

FIELD OF THE INVENTION

The present invention relates to an apparatus and a method for drawing a stereoscopic image.

BACKGROUND OF THE INVENTION

In a method for drawing a stereoscopic image as the prior art, an integral imaging (Hereinafter, it is called "II") system is well known. In this system, each pixel of a plurality of images (multi-view image) having a parallax is dispersedly positioned on one image (Hereinafter, it is called "elemental image"). By controlling an orbit of a light from each pixel (composing the elemental image) with a lenticular lens, an observer can perceive a stereoscopic image (the II system is called "integral photography system"). This II system is known as an ideal method for drawing a stereoscopic image regenerated with nearly actual light. However, in the II system, a resolution of the image is low because each pixel of a plurality of images is dispersedly positioned on one elemental image.

Accordingly, one-dimensional II system, which prevents the resolution from lowering by assigning a parallax along a horizontal direction of the elemental image, is proposed. In this one-dimensional II system, a coordinate (x,y,z) of each vertex of a drawing object (three-dimensional CG model) is multiplied with a perspective projection matrix. After that, values of y-coordinate and z-coordinate are respectively divided by $1-z/d$ (d: a center of projection). As a result, a value along the horizontal direction (x-coordinate) is subjected to a parallel projection, and a value along the vertical direction (y-coordinate) is subjected to a perspective projection.

In JP-A 2004-257124 (Kokai), above-mentioned method, i.e., a value along the horizontal direction is subjected to the parallel projection and a value along the vertical direction is subjected to the perspective projection, is disclosed (Hereinafter, it is called "a first method for drawing a stereoscopic image"). However, another method, i.e., a value along the horizontal direction is subjected to the perspective projection and a value along the vertical direction is subjected to the parallel projection, is not disclosed (Hereinafter, it is called "a second method for drawing a stereoscopic image"). Accordingly, a stereoscopic image cannot be drawn by switching the first method for drawing a stereoscopic image and the second method for drawing a stereoscopic image.

SUMMARY OF THE INVENTION

The present invention is directed to an apparatus and a method for drawing by switching a stereoscopic image having a parallax along the horizontal direction and a stereoscopic image having a parallax along the vertical direction.

According to an aspect of the present invention, there is provided an apparatus for drawing a stereoscopic image, comprising: a storage unit configured to store coordinate values of an object located in a coordinate space, the coordinate space being represented by a first direction, a second direction and a third direction each different, the coordinate values including first coordinate values along the first direction, second coordinate values along the second direction and third coordinate values along the third direction; a display unit configured to display a stereoscopic image of the object, the stereoscopic image having a parallax along one of the first direction and the second direction; a detection unit configured to detect a direction of the parallax; and a projection operation unit configured to subject the first coordinate values to a parallel projection when the direction of the parallax is the first direction, and subject the second coordinate values to the parallel projection when the direction of the parallax is the second direction.

DETAILED DESCRIPTION OF THE EMBODIMENTS

Hereinafter, embodiments of the present invention will be explained by referring to the drawings. The present invention is not limited to the following embodiments.

(The First Embodiment)

Figure 1:
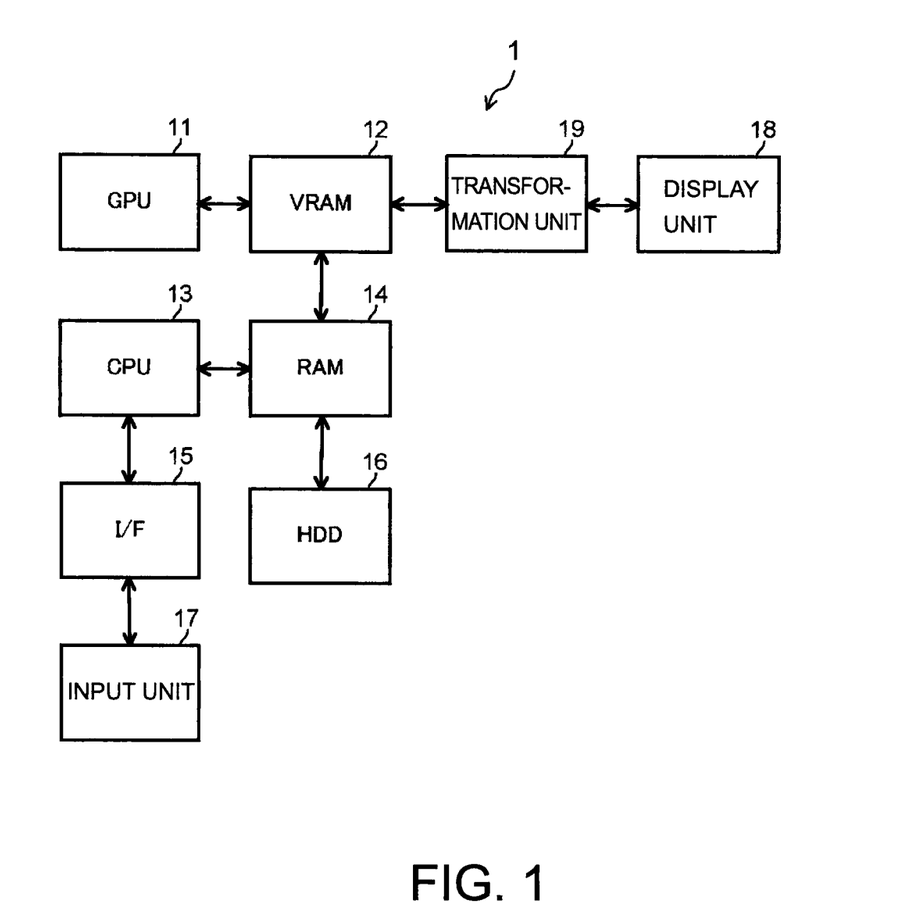
FIG. 1 is a hardware component of a stereoscopic image drawing apparatus according to a first embodiment.
Figure 2:
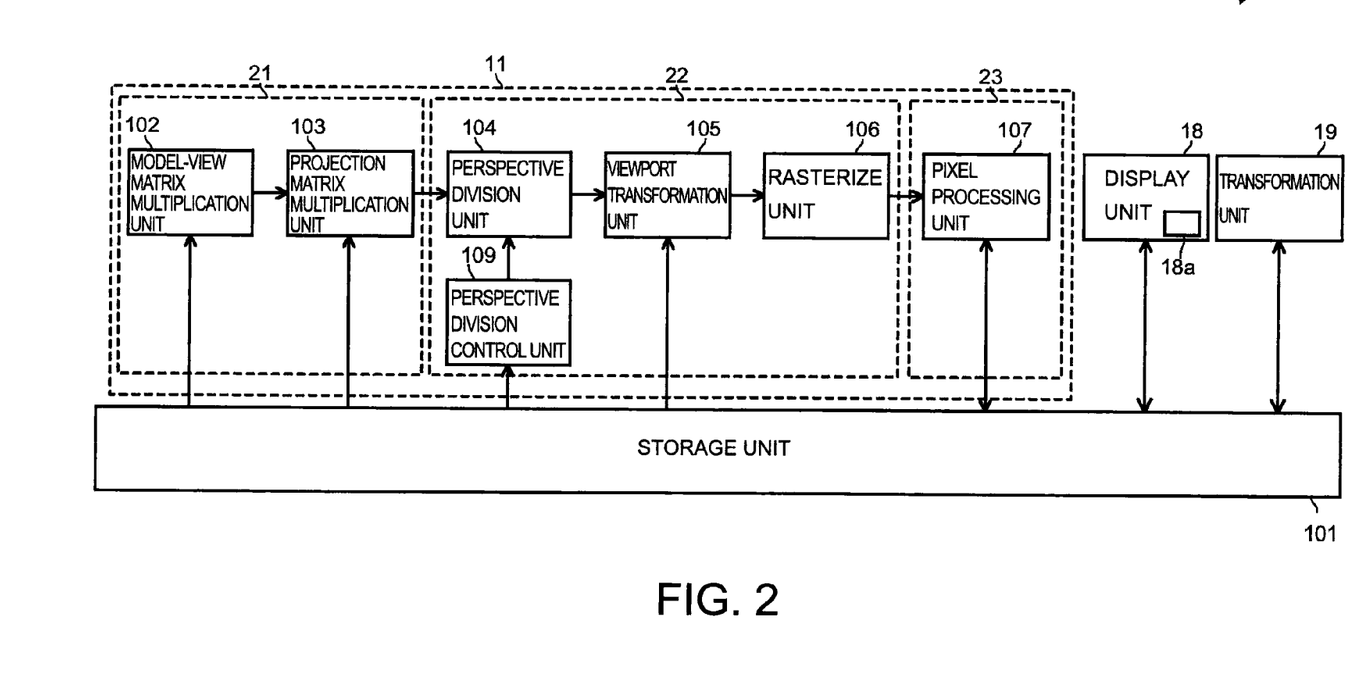
FIG. 2 is a block diagram of the stereoscopic image drawing apparatus according to the first embodiment.
Figure 3:
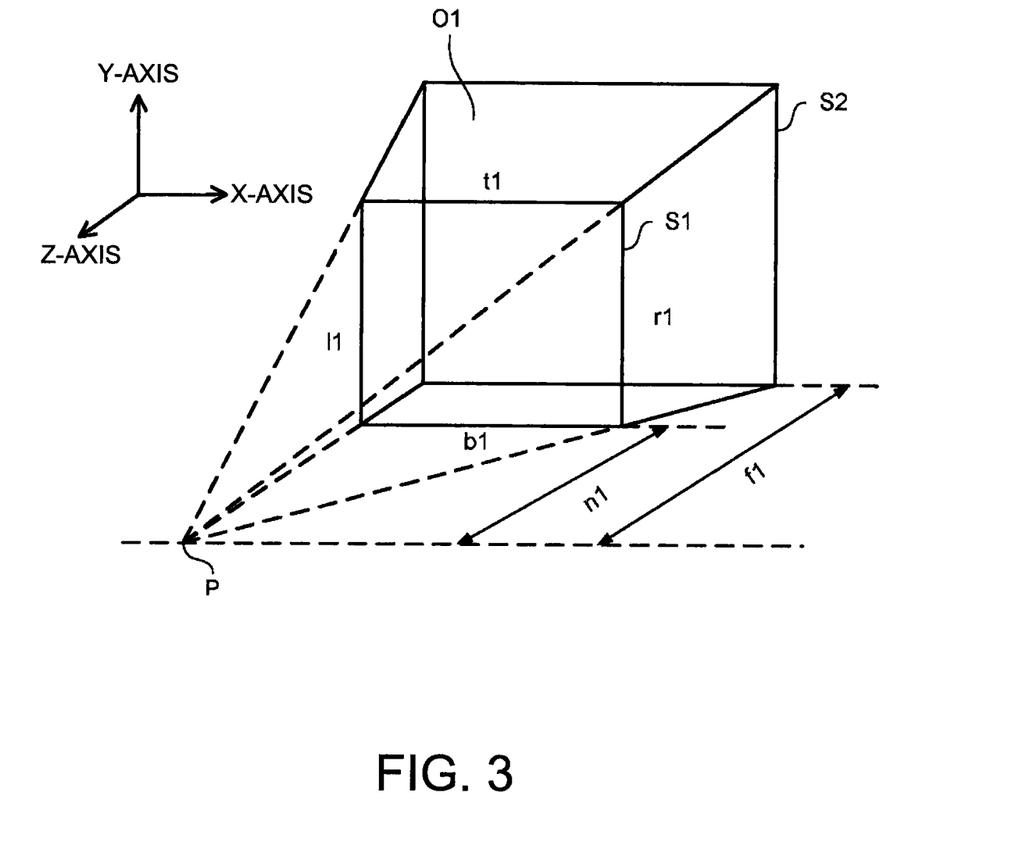
FIG. 3 is a schematic diagram showing a perspective projection.
Figure 4:
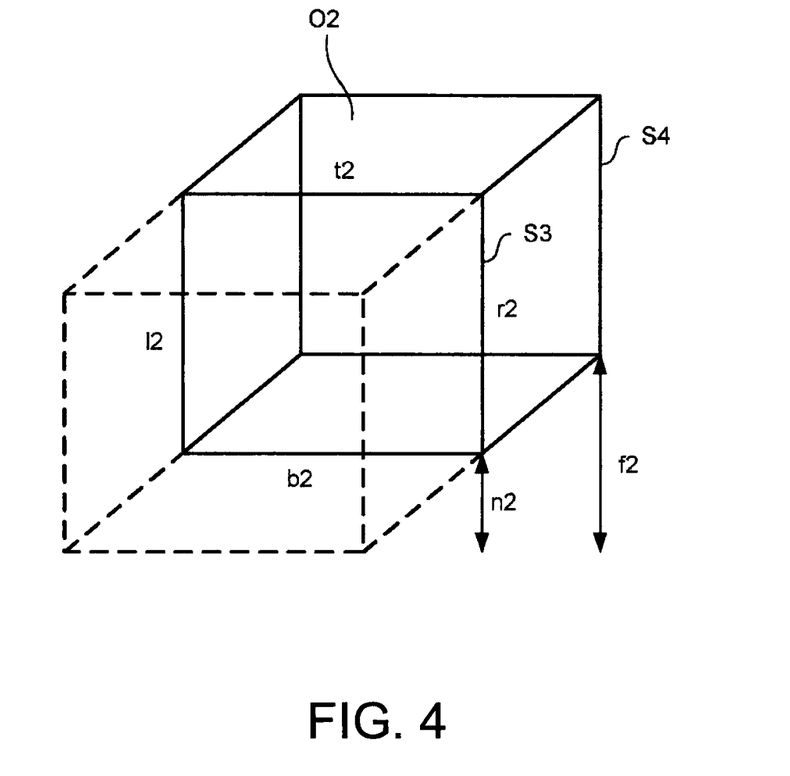
FIG. 4 is a schematic diagram showing a parallel projection.
Figure 5A:
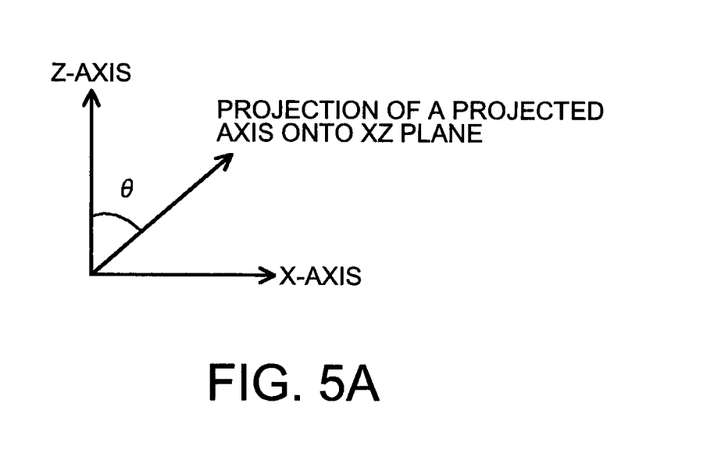
FIGS. 5A and 5B are schematic diagrams to explain parameters $\theta$ and $\phi$.
Figure 5B:
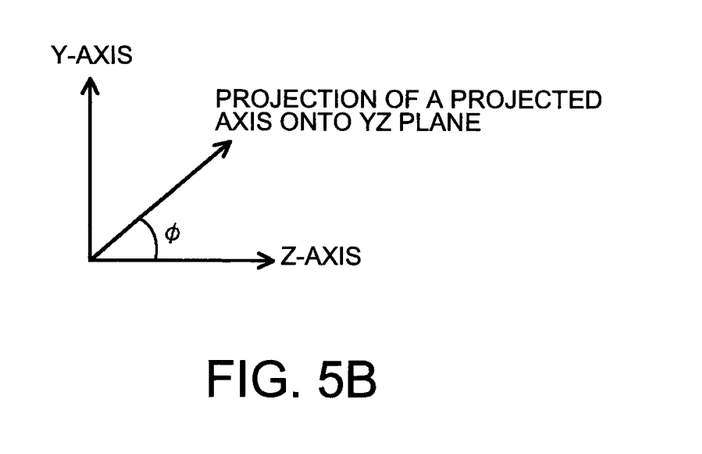

FIG. 1 is a hardware component of a stereoscopic image drawing apparatus 1 according to a first embodiment. FIG. 2 is a block diagram of the stereoscopic image drawing apparatus 1 according to the first embodiment. FIG. 3 is a schematic diagram showing a perspective projection. FIG. 4 is a schematic diagram showing a parallel projection. FIGS. 5A and 5B are schematic diagrams to explain parameters $\theta$ and $\phi$.

It is difficult for a regular camera that, a value along the horizontal direction is subjected to the perspective projection and a value along the vertical direction is subjected to the parallel projection, and a value along the horizontal direction is subjected to the parallel projection and a value along the vertical direction is subjected to the perspective projection. Accordingly, in the first embodiment, as to an object drawn in a virtual three-dimensional space by CG, a mode to switch a stereoscopic image having a parallax along the horizontal direction and a stereoscopic image having a parallax along the vertical direction is explained. In this case, "having a parallax along the horizontal direction" means stereoscopically visualizing the image along the horizontal direction. Furthermore, "having a parallax along the vertical direction" means stereoscopically visualizing the image along the vertical direction.

As shown in FIG. 1, the stereoscopic image drawing apparatus 1 includes a GPU (Graphic Processing Unit) 11, a VRAM 12, a CPU 13, a RAM 14, an I/F 15, an HDD 16, an input unit 17 (such as a mouse or a key board), a display unit 18, and a transformation unit 19.

When data is input from the input unit 17 or the HDD 16, the CPU 13 or the RAM 14 sends the input data for graphics processing to the GPU 11. The GPU 11 generates a plurality of image data (multi-view image) having a parallax based on the input data, and writes the image data into the VRAM 12. The transformation unit 19 dispersedly locates each pixel of the multi-view image (generated by the GPU 11) on one image, and transforms the multi-view image to an elemental image. The display unit 18 displays the elemental image transformed from the image data (written into the VRAM 12) by the transformation unit 19. The transformation unit 19 may be omitted by using the GPU 11 or the CPU 13.

As shown in FIG. 2, the stereoscopic image drawing apparatus 1 includes a storage unit 101, a model-view matrix multiplication unit 102, a projection matrix multiplication unit 103, a perspective division unit 104, a viewport transformation unit 105, a rasterize unit 106, a pixel processing unit 107, the display unit 18, the transformation unit 19, and a perspective division control unit 109.

The model-view matrix multiplication unit 102 and the projection matrix multiplication unit 103 are included in a vertex shader 21. The perspective division unit 104, the viewport transformation unit 105, the rasterize unit 106 and the perspective division control unit 109 are included in a rasterizer 22. The pixel processing unit 107 is included in a pixel shader 23.

Furthermore, the projection matrix multiplication unit 103, the perspective division unit 104 and the perspective division control unit 109 are included in a projection operation unit. The perspective division unit 104 and the perspective division control unit 109 are included in a first perspective operation unit.

Recently, as to a graphics processor, operation of the vertex shader 21 and the pixel shader 23 are often controlled with a program by a user. Accordingly, function of the vertex shader 21 and the pixel shader can be change by the software. Furthermore, function of the rasterizer 22 is fixed. Accordingly, in order to change the function of the rasterizer 22, change of a hardware circuit is necessary.

Hereinafter, detail function of the stereoscopic image drawing apparatus 1 of the first embodiment is explained.

(The Storage Unit 101)

The storage unit 101 stores coordinate data (Hereinafter, it is called "object coordinate") of each vertex of an object drawn in a virtual three-dimensional space by CG. The coordinate of each vertex of the object is represented as four-dimensional coordinates (x,y,z,w).

X-axis, Y-axis and Z-axis are mutually perpendicular, and form a three-dimensional perpendicular coordinates. X-axis is defined as a horizontal direction (first direction), Y-axis is defined as a vertical direction (second direction), and Z-axis is defined as a depth direction (third direction) on a screen of the display unit 18. In this case, the reason why a coordinate of each vertex of the object is represented as four dimensional coordinates (x,y,z,w) is, a transformation matrix used for API (Application Programming Interface) such as OpenGL is four-dimensional coordinates of "(four rows)×(four columns)". By using four-dimensional coordinates as the transformation matrix, a coordinate transformation of rotation and parallel moving can be described as one matrix. Regularly, w-coordinate is set to "1".

The storage unit 101 stores a model-view matrix (used by the model-view matrix multiplication unit 102) and a projection matrix (used by the projection matrix multiplication unit 103). Furthermore, the storage unit 101 stores data related to program describing steps of vertex shader processing and pixel shader processing. Various formats are applicable to data format stored in the storage unit. Briefly, the storage unit 101 stores data necessary for drawing desired CG.

Next, projection is explained. In general, a projection used for CG includes a perspective projection and a parallel projection.

(Perspective Projection)

The perspective projection is a method for converging a light axis from the object to one point (eye). In the perspective projection, an object near the eye is largely represented than an object far from the eye.

As shown in FIG. 3, in the perspective projection, a shape of a view volume O1 is a truncated square pyramid. The view volume O1 is a volume in a scene located relative to the eye P. An object located in the view volume O1 is a drawing object which is displayed on the display unit 18.

A projection matrix (perspective projection matrix) to perspectively project is represented as follows.

$$\begin{pmatrix} \frac{2n}{r-l} & 0 & \frac{r+l}{r-l} & 0 \\ 0 & \frac{2n}{t-b} & \frac{t+b}{t-b} & 0 \\ 0 & 0 & \frac{-(f+n)}{f-n} & \frac{-2fn}{f-n} \\ 0 & 0 & -1 & 0 \end{pmatrix} \quad (1)$$

In FIG. 3, n1 is a length between the eye P and a near clip plane S1, f1 is a length between the eye P and a far clip plane S2, r1 is a length of the right side of the near clip plane S1, l1 is a length of the left side of the near clip plane S1, t1 is a length of the upper side of the near clip plane S1, b1 is a length of the lower side of the near clip plane S1.

(Parallel Projection)

The parallel projection is a method for parallely projecting a light axis from the object to an arbitrary axis (parallel axis). The parallel projection includes an orthographic projection and an oblique projection.

The orthographic projection is, for example, on an eye coordinate centering the eye, a parallel projection which a projection axis is parallel to a depth direction (Z-axis direction). Briefly, an angle between a projection plane and a projection line is perpendicular.

On the other hand, the oblique projection is a parallel projection which the projection axis is not parallel to the depth direction (Z-axis direction). Briefly, an angle between the projection plane and the projection line is not perpendicular. In the stereoscopic image drawing apparatus 1 using II system, the oblique projection is used for drawing a stereoscopic image. Hereinafter, in case of describing "parallel projection", the oblique projection is indicated. As shown in FIG. 4, in the parallel projection, a shape of a view volume O2 is a rectangular parallelepiped.

A projection matrix (parallel projection matrix) to parallely project is represented as follows.

$$\begin{pmatrix} \frac{2}{r-l} & 0 & \frac{2\tan\theta}{r-l} & -\frac{r+l-2n\tan\theta}{r-l} \\ 0 & \frac{2}{t-b} & \frac{2\tan\phi}{t-b} & -\frac{t+b-2n\tan\phi}{t-b} \\ 0 & 0 & \frac{-2}{f-n} & \frac{f+n}{f-n} \\ 0 & 0 & 0 & 1 \end{pmatrix} \quad (2)$$

In FIG. 4, n2 is a length between the eye P and a near clip plane S3, f2 is a length between the eye P and a far clip plane S4, r2 is a length of the right side of the near clip plane S3, l2 is a length of the left side of the near clip plane S2, t2 is a length of the upper side of the near clip plane S3, b2 is a length of the lower side of the near clip plane S3. Furthermore, as shown in FIGS. 5A and 5B, θ is an angle between a vector which a projection axis is projected onto XZ-plane and Z-axis, and is an angle between a vector which a projection axis is projected onto YZ-plane and Z-axis.

(Projection Matrix for One-Dimensional II)

In the stereoscopic image drawing apparatus 1 of the first embodiment, an image having a parallax along a horizontal direction or a vertical direction is displayed on the display unit 18. In case of displaying the image having a parallax along the horizontal direction, as to each vertex of the object, x-coordinate is subjected to a parallel projection, and y-coordinate is subjected to a perspective projection. In case of displaying the image having a parallax along the vertical direction, as to each vertex of the object, x-coordinate is subjected to the perspective projection, and y-coordinate is subjected to the parallel projection.

In order to realize such special projection, the storage unit 101 stores a projection matrix (Hereinafter, it is called "first projection matrix") used for displaying an image having a parallax along the horizontal direction, and a projection matrix (Hereinafter, it is called "second projection matrix") used for displaying an image having a parallax along the vertical direction.

The first projection matrix is represented as follows.

$$\begin{pmatrix} \frac{2}{r-l} & 0 & \frac{2\tan\theta}{r-l} & -\frac{r+l-2n\tan\theta}{r-l} \\ 0 & \frac{2n}{t-b} & \frac{t+b}{t-b} & 0 \\ 0 & 0 & \frac{-(f+n)}{f-n} & \frac{-2fn}{f-n} \\ 0 & 0 & -1 & 0 \end{pmatrix} \quad (3)$$

In the first projection matrix, at a position (first row) related to calculation of x-coordinate, corresponding elements of a parallel projection matrix are set. At each position (second row~fourth row) related to calculation of y-coordinate, z-coordinate and w-coordinate, corresponding elements of a perspective projection matrix are set.

Next, the second projection matrix is represented as follows.

$$\begin{pmatrix} \frac{2n}{r-l} & 0 & \frac{r+l}{r-l} & 0 \\ 0 & \frac{2}{t-b} & \frac{2\tan\phi}{t-b} & -\frac{t+b-2n\tan\phi}{t-b} \\ 0 & 0 & \frac{-(f+n)}{f-n} & \frac{-2fn}{f-n} \\ 0 & 0 & -1 & 0 \end{pmatrix} \quad (4)$$

In the second projection matrix, at each position (first row, third row, fourth row) related to calculation of x-coordinate, z-coordinate and w-coordinate, corresponding elements of a perspective projection matrix are set. At a position (second row) related to calculation of y-coordinate, corresponding elements of a parallel projection matrix are set.

(The Model-view Matrix Multiplication Unit)

The model-view matrix multiplication unit 102 reads a model-view matrix and object coordinates from the storage unit 101, and transforms the object coordinates to eye coordinates by multiplying the model-view matrix with the object coordinates.

This transformation is called "a model-view transformation". In the model-view transformation, object coordinates represented in a local coordinate system is transformed to eye coordinates. The eye coordinates are coordinates centering the eye of a camera (user) observing the object.

(The Projection Matrix Multiplication Unit 103)

The projection matrix multiplication unit 103 prepares a detection unit (not shown in Fig.) to detect a type of the display unit 18 (the type is stored in a type maintenance unit 18a). Based on a detection result by the detection unit, the projection matrix multiplication unit 103 reads a projection matrix stored in the storage unit 101. Briefly, when the display unit 18 displays an image having a parallax along the horizontal direction, the projection matrix multiplication unit 103 reads the first projection matrix. When the display unit 18 displays an image having a parallax along the vertical direction, the projection matrix multiplication unit 103 reads the second projection matrix. By multiplying the projection matrix with eye coordinates (calculated by the model-view matrix multiplication unit 102), the projection matrix multiplication unit 103 calculates a clip coordinate of each vertex of the object.

(The Perspective Division Control Unit)

Figure 6A:
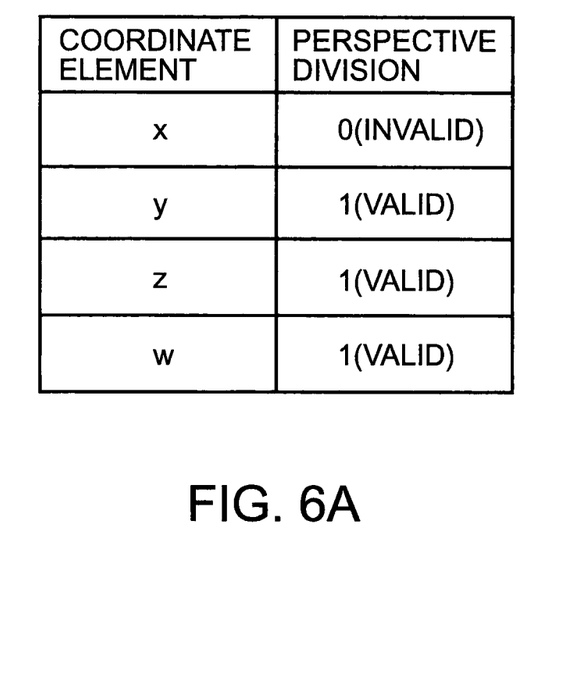
FIGS. 6A and 6B are schematic diagrams showing table data stored in a perspective division control unit in FIG. 2.

The perspective division control unit 109 prepares a detection unit (not shown in Fig.) to detect a type of the display unit 18 (the type is stored in the type maintenance unit 18a). Furthermore, the perspective division control unit 109 prepares a memory (not shown in Fig.) storing table data shown in FIGS. 6A and 6B.

When the display unit 18 displays an image having a parallax along the horizontal direction, after multiplying the projection matrix, x-coordinate of each peal is not divided. Other coordinates of each vertex are divided by w-coordinate.

On the other hand, when the display unit 18 displays an image having a parallax along the vertical direction, after multiplying the projection matrix, y-coordinate of each peal is not divided. Other coordinates of each vertex are divided by w-coordinate.

In order for the perspective division unit 104 to realize perspective division processing by selecting specified coordinate values, the perspective division control unit 109 controls the perspective division unit 104 based on a type of the display unit 18. Concretely, based on the horizontal direction or the vertical direction along which the display unit 18 has a parallax, a control signal to validate or invalidate a division of each coordinate value is generated, and input to the perspective division unit 104.

The perspective division control unit 109 uses table data (stored in the memory) based on a detection result by the detection unit. If the display unit 18 has a parallax along the horizontal direction, the perspective division control unit 109 uses table data shown in FIG. 6A. In this case, the perspective division control unit 109 generates a control signal to invalidate a perspective division of x-coordinate and validate a perspective division of y, z, w-coordinates, and inputs the control signal to the perspective division unit 104.

Figure 6B:
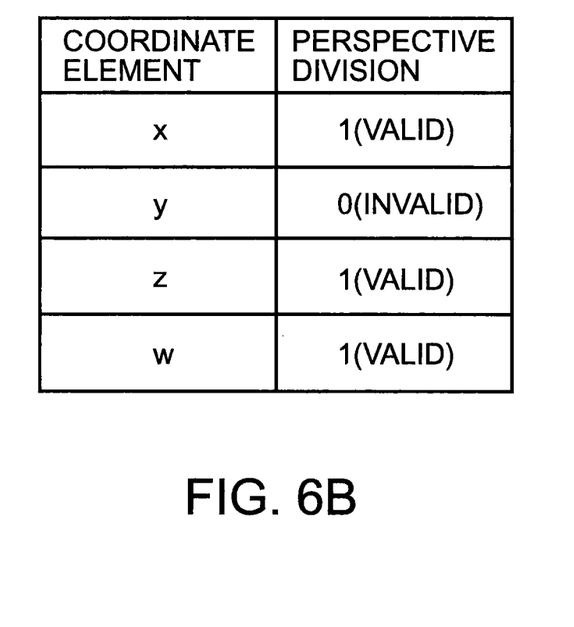

If the display unit 18 has a parallax along the vertical direction, the perspective division control unit 109 uses table data shown in FIG. 6B. In this case, the perspective division control unit 109 generates a control signal to invalidate a perspective division of y-coordinate and validate a perspective division of x, z, w-coordinates, and inputs the control signal to the perspective division unit 104. The table data shown in FIGS. 6A and 6B may be stored in the storage unit 101, and read by the perspective division control unit 109, based on the detection result.

(The Perspective Division Unit)

Based on the control signal input from the perspective division control unit 109, the perspective division unit 104 divides a clip coordinate value (x,y,z,w) of each vertex (input from the projection matrix multiplication unit 103) by w-coordinate.

From the control signal input from the perspective division control unit 109, the perspective division unit 104 decides a coordinate element to validate a perspective division. As to the coordinate element decided to validate the perspective division, the perspective division unit 104 operates following equations (5)~(8).

$$x'=x/w \quad (5)$$

$$y'=y/w \quad (6)$$

$$z'=z/w \quad (7)$$

$$w'=w/w \quad (8)$$

In this way, a normalized device coordinate of each vertex is calculated. When the display unit 18 displays an image having a parallax along the horizontal direction, the normalized device coordinate is (x,y',z',w'). Furthermore, when the display unit 18 displays an image having a parallax along the vertical direction, the normalized device coordinate is (x',y,z',w').

(The Viewport Transformation Unit)

Based on a size of a viewport (drawing area) read from the storage unit 101, the viewport transformation unit 105 enlarges or reduces x-coordinate and y-coordinate of the normalized device coordinates of each vertex of the object (calculated by the perspective division unit 104), and calculates a window coordinate of each vertex of the object.

(The Rasterize Unit)

In order for a display to draw (or for a printer to print) a text or an image processed by a computer, the rasterize unit 106 decomposes an inner area of a polygon defined by each vertex (having the window coordinate calculated by the viewport transformation unit 105) into a set of pixels.

The polygon (calculated by the viewport transformation unit 105) represents an image by the window coordinate of each vertex and connection information thereof. This representation method is called "a vector graphics". On the other hand, the display processes the image as a set of pixels. Information of the vector graphics cannot be directly drawn or printed. Accordingly, by exposing information of the vector graphics, the rasterize unit 106 decomposes the information into the set of pixels.

(The Pixel Processing Unit)

The pixel processing unit 107 calculates a drawing color of each pixel output from the rasterize unit 106, and writes the drawing color into an image memory of the storage unit 101.

(The Transformation Unit)

The transformation unit 19 dispersedly locates each pixel of the image (written into the storage unit 101 by the pixel processing unit 107) on one image, and generates an elemental image. The elemental image is written into the storage unit 101.

(The Display Unit)

The display unit 18 prepares a type maintenance unit 18a to maintain a type of the display unit 18. Furthermore, the display unit 18 displays the elemental image (stored in the storage unit 101 by the transformation unit 19). The display unit 18 equips a display screen to display each elemental pixel of the image (to be stereoscopically displayed), and a lenticular lens (array lens) or a pin-hole plate to control a light from the display screen. In this case, if the display screen is a type on which pixels are fixedly located as a matrix shape, the display screen may be a liquid crystal display apparatus of a projection type or a direct-view type, a plasma display apparatus, a display apparatus of field emission type, or a display apparatus of organic EL.

Figure 7:
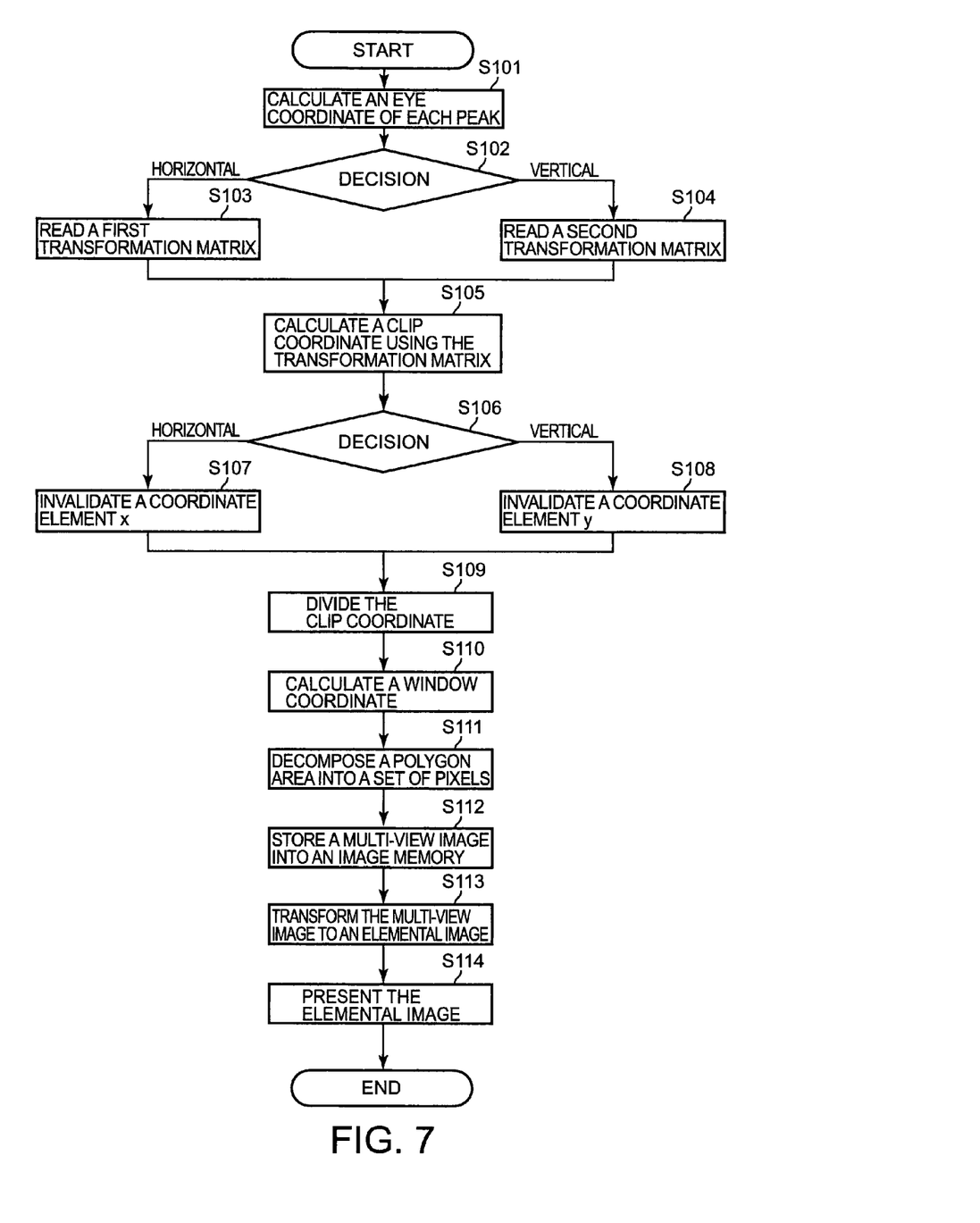
FIG. 7 is a flow chart of the stereoscopic image drawing apparatus according to the first embodiment.

Next, processing of the stereoscopic image drawing apparatus 1 of the first embodiment is explained. FIG. 7 is a flow chart of processing of the stereoscopic image drawing apparatus 1. First, the model-view matrix multiplication unit 102 multiplies a model-view matrix with an object coordinate, and transforms the object coordinate to an eye coordinate (S101).

The projection matrix multiplication unit 103 detects a type of the display unit 18 from the type maintenance unit 18a of the display unit 18. Based on the type of the display unit 18, the projection matrix multiplication unit 103 decides the horizontal direction or the vertical direction along which the display unit 18 displays the image having a parallax (S102).

If the display unit 18 displays the image having the parallax along the horizontal direction, the projection matrix multiplication unit 103 reads a first projection matrix from the storage unit 101 (S103). Furthermore, if the display unit 18 displays the image having the parallax along the vertical direction, the projection matrix multiplication unit 103 reads a second projection matrix from the storage unit 101 (S104). By multiplying the projection matrix with eye coordinates (calculated by the model-view matrix multiplication unit 102), the projection matrix multiplication unit 103 calculates a clip coordinate of each vertex of the object (S105).

The perspective division control unit 109 detects a type of the display unit 18 from the type maintenance unit 18a of the display unit 18. Based on the type of the display unit 18, the perspective division control unit 109 decides the horizontal direction or the vertical direction along which the display unit 18 displays the image having a parallax (S106).

If the display unit 18 displays the image having the parallax along the horizontal direction, the perspective division control unit 109 generates a control signal to invalidate a perspective division of x-coordinate and validate a perspective division of y, z, w-coordinates, and inputs the control signal to the perspective division unit 104 (S107).

Furthermore, if the display unit 18 displays the image having the parallax along the vertical direction, the perspective division control unit 109 generates a control signal to invalidate a perspective division of y-coordinate and validate a perspective division of x, z, w-coordinates, and inputs the control signal to the perspective division unit 104 (S108).

Based on the control signal input from the perspective division control unit 109, the perspective division unit 104 divides a clip coordinate of each vertex (input from the projection matrix multiplication unit 103) by w-coordinate (S109).

The viewport transformation unit 105 calculates a window coordinate of each vertex of the object (S110). The rasterize unit 106 decomposes an inner area of a polygon defined by each vertex having the window coordinate (calculated by the viewport transformation unit 105) into a set of pixels (S111).

The pixel processing unit 107 calculates a drawing color of each pixel (output from the rasterize unit 106), and stores a multi-view image (having the drawing color) into an image memory of the storage unit 101 (S112). The transformation unit 19 transforms the multi-view image (stored into the storage unit 101 by the pixel processing unit 107) to an elemental image, and stores the elemental image into the storage unit 101 (S113). The display unit 18 displays the elemental image stored in the storage unit 101 by the transformation unit 19 (S114).

As mentioned-above, in the stereoscopic image drawing apparatus 1 of the first embodiment, from vertex coordinates multiplied with a projection matrix, a specified coordinate value is selected and divided. As a result, by using the GPU 11, a stereoscopic image of one-dimensional II system can be quickly drawn. Furthermore, based on a type of the display unit 18, the stereoscopic image having a parallax along the horizontal direction and the stereoscopic image having a parallax along the vertical direction can be drawn by switching.

The type of the display unit 18 may be input from the input unit 17 by a user. In this case, based on the type of the display unit 18 (input from the input unit 17), the projection matrix multiplication unit 103 reads a projection matrix from the storage unit 101. Based on the type of the display unit 18, the perspective division control unit 109 utilizes table data shown in FIG. 6A or FIG. 6B.

In this case, even if the type of the display unit 18 is not stored in the type maintenance unit 18a, by inputting the type of the display unit 18 from the user, a stereoscopic image suitable for the type of the display unit 18 can be drawn.

(The Second Embodiment)

In the first embodiment, by controlling operation of the perspective division unit 104 included in the rasterizer 22, a specified coordinate value is selected from vertex coordinates, and perspectively divided. However, in order to control operation of the rasterizer 22 (as a fixed function) installed in a graphics processor, a hardware circuit must include the perspective division control unit.

In the second embodiment, by executing necessary processing with a vertex shader (controlled by a user program), a specified coordinate is selected from vertex coordinates and perspectively divided. In the stereoscopic image drawing apparatus 2 of the second embodiment, the vertex shader selects a specified coordinate value from vertex coordinates, and subjects the specified coordinate value to a perspective multiplication (inverse operation of a perspective division). After that, by dividing all coordinate values of each vertex by the perspective division unit, effect of the perspective division of the specified coordinate value by the perspective division unit is canceled. Accordingly, the hardware circuit need not include the perspective division control unit, and the specified coordinate value of vertex coordinates is selectively subjected to a perspective division.

Figure 8:
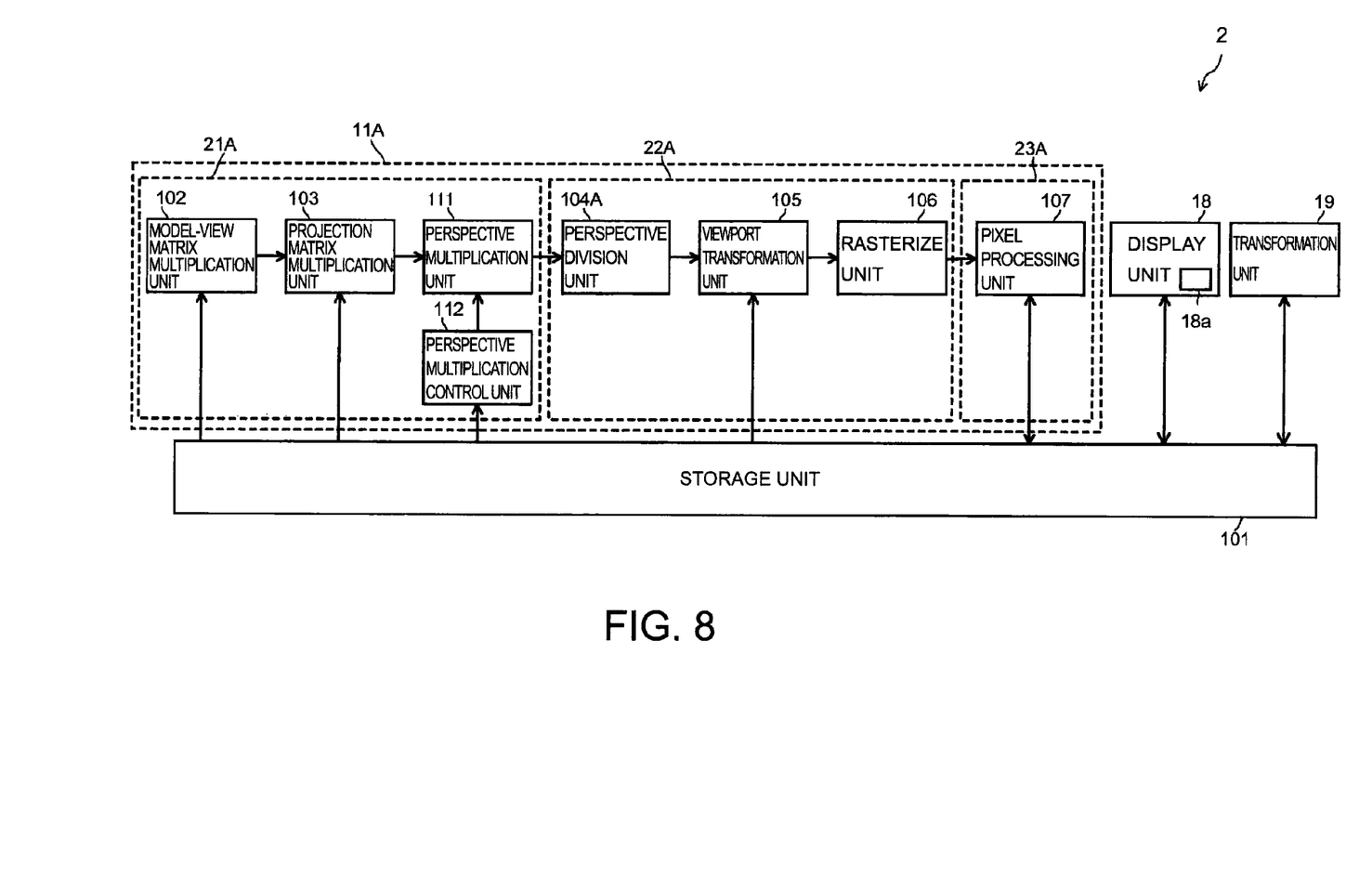
FIG. 8 is a block diagram of the stereoscopic image drawing apparatus according to a second embodiment.

FIG. 8 is a block diagram of the stereoscopic image drawing apparatus 2 of the second embodiment. The stereoscopic image drawing apparatus 2 includes the storage unit 101, the model-view matrix multiplication unit 102, the projection matrix multiplication unit 103, a perspective division unit 104A, the viewport transformation unit 105, the rasterize unit 106, the pixel processing unit 107, the display unit 18, the transformation unit 19, a perspective multiplication unit 111, and a perspective multiplication control unit 112. In the same way as the first embodiment, the transformation unit 19 may be omitted by substituting the GPU 11 or the CPU 13.

The model-view matrix multiplication unit 102, the projection matrix multiplication unit 103, the perspective multiplication unit 111 and the perspective multiplication control unit 112, are included in a vertex shader 21A. The perspective division unit 104A, the viewport transformation unit 105 and the rasterize unit 106, are included in a rasterizer 22A. The pixel processing unit 107 is included in a pixel shader 23A.

Furthermore, the projection matrix multiplication unit 103, the perspective division unit 104A, the perspective multiplication unit 111 and the perspective multiplication control unit 112, are included in a projection operation unit. The perspective division unit 104A, the perspective multiplication unit 111 and the perspective multiplication control unit 112 are included in a second perspective operation unit.

The hardware component is same as that of the stereoscopic image drawing apparatus 1 of the first embodiment. Accordingly, its Figure and explanation are omitted. Furthermore, as to component elements already explained in FIG. 2, the same sign is assigned, and its explanation is omitted.

Hereinafter, detail of the stereoscopic image drawing apparatus 2 of the second embodiment is explained.

(The Perspective Multiplication Control Unit)

Figure 9A:
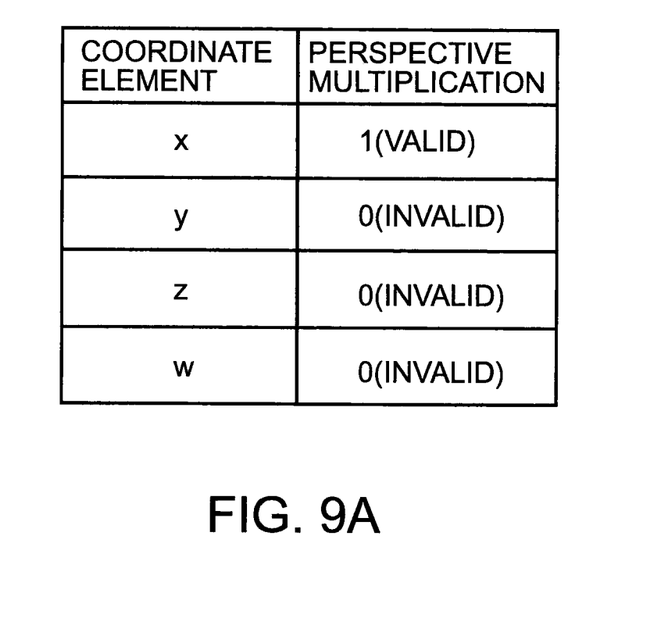
FIGS. 9A and 9B are schematic diagrams showing table data stored in a perspective division control unit in FIG. 8.

The perspective multiplication control unit 112 prepares a detection unit (not shown in Fig.) to detect a type of the display unit 18 (the type is stored in the type maintenance unit 18a). Furthermore, the perspective multiplication control unit 112 prepares a memory (not shown in Fig.) storing table data shown in FIGS. 9A and 9B.

The perspective multiplication control unit 112 controls the perspective multiplication unit 111 based on a type of the display unit 18. Concretely, in order for the perspective multiplication unit 111 to realize perspective multiplication processing by selecting specified coordinate values, based on the horizontal direction or the vertical direction along which the display unit 18 has a parallax, a control signal to validate or invalidate a multiplication of each coordinate value is generated, and input to the perspective multiplication unit 114.

The detection unit of the perspective multiplication control unit 112 detects a type of the display unit 18 maintained in the type maintenance unit 18a. If the display unit 18 has a parallax along the horizontal direction, the perspective multiplication control unit 112 uses table data shown in FIG. 9A. In this case, the perspective division multiplication control unit 112 generates a control signal to validate a perspective multiplication of x-coordinate and invalidate a perspective multiplication of y, z, w-coordinates, and inputs the control signal to the perspective division unit 111.

Figure 9B:
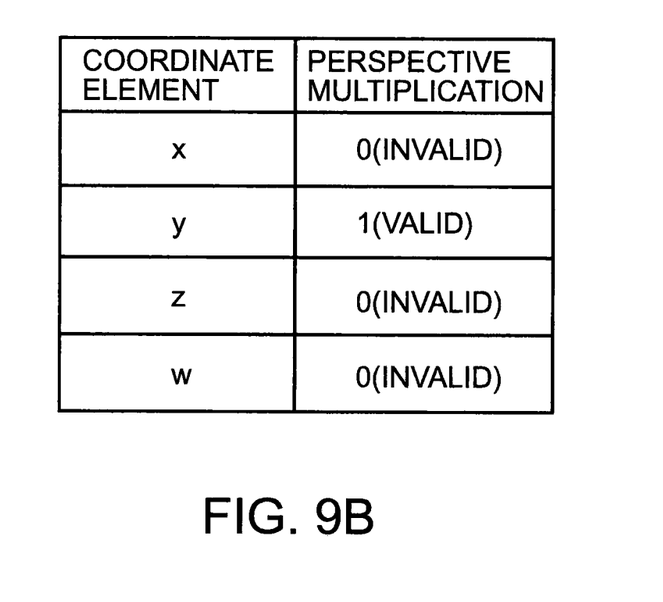

If the display unit 18 has a parallax along the vertical direction, the perspective multiplication control unit 112 uses table data shown in FIG. 9B. In this case, the perspective multiplication control unit 112 generates a control signal to validate a perspective multiplication of y-coordinate and invalidate a perspective multiplication of x, z, w-coordinates, and inputs the control signal to the perspective division unit 111. The table data shown in FIGS. 9A and 9B may be stored in the storage unit 101, and read by the perspective multiplication control unit 112, based on the type of the display unit 18.

(The Perspective Multiplication Unit)

Based on the control signal input from the perspective multiplication control unit 112, the perspective multiplication unit 111 multiplies a clip coordinate value (x,y,z,w) of each vertex (input from the projection matrix multiplication unit 103) by w-coordinate. This multiplication is an inverse operation of the perspective division.

From the control signal input from the perspective multiplication control unit 112, the perspective multiplication unit 111 decides a coordinate element to validate a perspective multiplication. As to the coordinate element decided to validate the perspective multiplication, the perspective multiplication unit 111 operates following equations (9)~(12).

$$x''=x\times w \quad (9)$$

$$y''=y\times w \quad (10)$$

$$z''=z\times w \quad (11)$$

$$w''=w\times w \quad (12)$$

(The Perspective Division Unit)

The perspective division unit 104A divides all coordinate values of a clip coordinate of each vertex (input from the perspective multiplication unit 111) by w-coordinate, and calculates a normalized device coordinate of each vertex.

If the display unit 18 displays an image having a parallax along the horizontal direction, the perspective multiplication unit 111 multiplies x-coordinate of vertex coordinates with w-coordinate. After that, the perspective division unit 104A divides x-coordinate (multiplied with w-coordinate) by w-coordinate. As a result, by canceling effects of the multiplication and the division, x-coordinate is returned to an original value output from the projection matrix multiplication unit 103.

On the other hand, if the display unit 18 displays an image having a parallax along the vertical direction, the perspective multiplication unit 111 multiplies y-coordinate of vertex coordinates with w-coordinate. After that, the perspective division unit 104A divides y-coordinate (multiplied with w-coordinate) by w-coordinate. As a result, by canceling effects of the multiplication and the division, y-coordinate is returned to an original value output from the projection matrix multiplication unit 103.

Briefly, as to the drawing apparatus of one-dimensional II system of which the display unit has a parallax along the horizontal direction, a normalized device coordinate of each vertex is (x,y',z',w'), which is the same result as the first embodiment. Furthermore, as to the drawing apparatus of one-dimensional II system of which the display unit has a parallax along the vertical direction, a normalized device coordinate of each vertex is (x',y,z',w'), which is the same result as the first embodiment.

Figure 10:
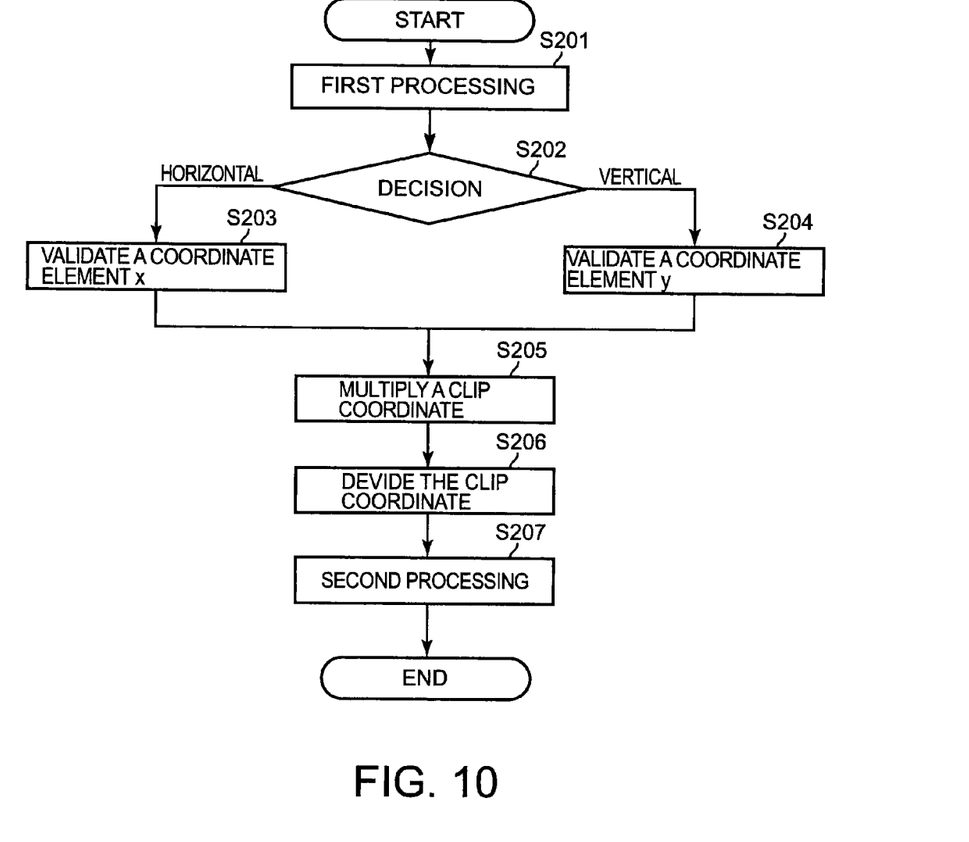
FIG. 10 is a flow chart of the stereoscopic image drawing apparatus according to the second embodiment.

Next, processing of the stereoscopic image drawing apparatus 2 of the second embodiment is explained. FIG. 10 is a flow chart of processing of the stereoscopic image drawing apparatus 2. First, in the stereoscopic image drawing apparatus 2, processing of S101~S105 (first processing) explained in FIG. 7 is executed (S201).

The perspective multiplication control unit 112 detects a type of the display unit 18 from the type maintenance unit 18a of the display unit 18. Based on the type of the display unit 18, the perspective multiplication control unit 112 decides the horizontal direction or the vertical direction along which the display unit 18 displays the image having a parallax (S202).

If the display unit 18 displays the image having the parallax along the horizontal direction, the perspective multiplication control unit 112 generates a control signal to validate a perspective multiplication of x-coordinate and invalidate a perspective multiplication of y, z, w-coordinates, and inputs the control signal to the perspective multiplication unit 111 (S203).

Furthermore, if the display unit 18 displays the image having the parallax along the vertical direction, the perspective multiplication control unit 112 generates a control signal to validate a perspective multiplication of y-coordinate and invalidate a perspective multiplication of x, z, w-coordinates, and inputs the control signal to the perspective multiplication unit 111 (S204).

Based on the control signal input from the perspective multiplication control unit 112, the perspective multiplication unit 111 multiplies a clip coordinate (x,y,z,w) of each vertex (input from the projection matrix multiplication unit 103) with w-coordinate (S205).

The perspective division unit 104A divides all coordinate values of a clip coordinate of each vertex (input from the perspective multiplication unit 111) by w-coordinate, and calculates a normalized device coordinate of each vertex (S206). After that, in the stereoscopic image drawing apparatus 2, processing of S110~S114 (second processing) explained in FIG. 7 is executed (S207).

As mentioned-above, in the stereoscopic image drawing apparatus 2 of the second embodiment, after a projection matrix is multiplied with vertex coordinates, by selectively multiplying a specified coordinate value (from the vertex coordinates), effect of the perspective division of the specified coordinate value is cancelled. As a result, a general perspective division function (as a fixed function) installed in the graphics processor can be used. Accordingly, by using the existing graphics processor, a stereoscopic image of one-dimensional II system can be quickly drawn. Another effect is same as that of the stereoscopic image drawing apparatus 1 of the first embodiment.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and embodiments of the invention disclosed herein. It is intended that the specification and embodiments be considered as exemplary only, with the scope and spirit of the invention being indicated by the claims.

What is claimed is:

1. An apparatus for drawing a stereoscopic image, comprising:
   a storage unit configured to store coordinate values of an object located in a coordinate space, the coordinate space being represented by a first direction, a second direction and a third direction each different, the coordinate values including first coordinate values along the first direction, second coordinate values along the second direction and third coordinate values along the third direction;
   a display unit configured to display a stereoscopic image of the object, the stereoscopic image having a parallax along one of the first direction and the second direction;
   a detection unit configured to detect a direction of the parallax; and
   a projection operation unit configured to multiply a first projection matrix with the coordinated values of the object when direction of the parallax is the first direction, and multiply a second projection matrix with the coordinate values of the object when the direction of the parallax is the second direction,
   wherein
   the first projection matrix subjects the first coordinate values to the parallel projection, and subjects the second coordinate values and the third coordinate values to a perspective projection,
   the second projection matrix subjects the second coordinate values to the parallel projection and subjects the first coordinate values and the third coordinate values to the prospective projection,
   the projection operation unit,
   after multiplying the first projection matrix, subjects the first coordinate values to a perspective multiplication, and the subjects the first coordinate values perspective-multiplied, the second coordinate values and the third coordinate values to the perspective division, and
   after multiplying the second projection matrix, subjects the second coordinate values to the perspective multiplication, and the subjects the first coordinate values, the second coordinate values perspective-multiplied and the third coordinate values to the perspective division.

2. A method for drawing a stereoscopic image, comprising:
   storing coordinate values of an object located in a coordinate space, the coordinate space being represented by a first direction, a second direction and a third direction each different, the coordinate values including first coordinate values along the first direction, second coordinate values along the second direction and third coordinate values along the third direction;
   displaying a stereoscopic image of the object having a parallax along one of the first direction and the second direction;
   detecting a direction of the parallax;
   multiplying a first projection matrix with the coordinate values of the object when the direction of the parallax is the first direction; and
   multiplying a second projection matrix with the coordinate values of the object when the direction of the parallax is the second direction,
   wherein
   the first projection matrix subjects the first coordinate values to the parallel projection and subjects the second coordinate values and the third coordinate values to a perspective projection,
   the second projection matrix subjects the second coordinate values to the parallel projection, and subjects the first coordinate values and the third coordinate values to the perspective projection,
   after multiplying the first projection matrix,
      subjecting the first coordinate values to a perspective multiplication; and
      subjecting the first coordinate values perspective-multiplied the second coordinate values and the third coordinate values to the perspective division;,
   after multiplying the second projection matrix
      subjecting the second coordinate values to the perspective multiplication; and
      subjecting the first coordinate values, the second coordinate values perspective-multiplied and the third coordinate values to the perspective division.

3. A non-transitory computer readable medium having a computer program stored thereon for causing a computer to perform a method for drawing a stereoscopic image, the method comprising:
   storing coordinate values of an object located in a coordinate space, the coordinate space being represented by a first direction, a second direction and a third direction each different, the coordinate values including first coordinate values along the first direction, second coordinate values along the second direction and third coordinate values along the third direction;
   displaying a stereoscopic image of the object having a parallax along one of the first direction and the second direction;
   detecting a direction of the parallax;
   multiplying a first projection matrix with the coordinate values of the object when the direction of the parallax is the first direction;
   multiplying a second projection matrix with the coordinate values of the object when the direction of the parallax is the second direction,
   wherein
   the first projection matrix subjects the first coordinate values to the parallel projection, and subjects the second coordinate values and the third coordinate values to a perspective projection,
   the second projection matrix subjects the second coordinate values to the parallel projection and subjects the first coordinate values and the third coordinate values to the perspective projection,
   after multiplying the first projection matrix,
      subjecting the first coordinate values to a perspective multiplication: and
      subjecting the first coordinate values perspective-multiplied, the second coordinate values and the third coordinate values to the perspective division;
   after multiplying the second projection matrix,
      subjecting the second coordinate values to the perspective multiplication; and
      subject the first coordinate values, the second coordinate values perspective-multiplied the third coordinate values to the perspective division.

* * * * *